United States Patent [19]
Deslongchamps

[11] 3,723,506
[45] Mar. 27, 1973

[54] OXIDATION OF SUGARS

[75] Inventor: Pierre Deslongchamps, Sherbrooke, Quebec, Canada

[73] Assignee: Universite De Sherbrooke, Sherbrooke, Quebec, Canada

[22] Filed: Aug. 11, 1971

[21] Appl. No.: 170,984

[52] U.S. Cl........260/484 R, 260/473 A, 260/473 G, 260/484 A

[51] Int. Cl..............................................C07c 69/66

[58] Field of Search.........260/484 R, 484 A, 473 A, 260/473 G

[56] References Cited

OTHER PUBLICATIONS

W. Pigman, The Carbohydrates pg. 482 (1957) Academic Press Inc.

Primary Examiner—Henry R. Jiles
Assistant Examiner—Paul J. Killos
Attorney—Cushman, Darby & Cushman

[57] ABSTRACT

The invention relates to a process which comprises treating with ozone a glycopyranoside acetal, wherein the OR grouping is in the equatorial orientation with respect to the anomeric center, thereby to form the corresponding aldonic acid ester, and wherein R is alkyl, aryl, aralkyl or a sugar moiety.

6 Claims, No Drawings

OXIDATION OF SUGARS

The present invention relates to a novel method for converting acetals to esters. More specifically it relates to a method of converting β-glycosides to aldonic acid esters.

The acetal grouping is a fundamental functional group of an important class of natural products, for example, carbohydrates in general and glycosides having various organic residues such as steroids or flavones. It is also known that nucleic acids such as deoxyribonucleic acids (DNA) and ribonucleic acids (RNA) contain a sugar moiety.

Glycosides can themselves be divided into two main classes depending on the configuration of the anomeric center which can be either α or β which may be illustrated as follows:

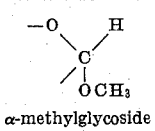
α-methylglycoside

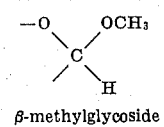
β-methylglycoside

As representatives of α sugars there may be mentioned starch, maltose and certain polymeric modifications of maltose such as glycogen. It is also known that certain antibiotics, such as, for example, streptomycin, are made of sugar units which contain the α-linkage. Sucrose has also an α-glycoside unit. An interesting feature of α-glycosides is that they are readily digested by the human organism.

As a main representative of β-glycosides there may be mentioned cellulose which is the polymeric form of cellobiose the latter being obtained by careful hydrolysis of cellulose. Cellobiose is a reducing sugar consisting of two glucose units, and since it is hydrolyzed by emulsion, a β-glycosidase, the substance evidently is a glucose-β-glucoside. Cellobiose may be represented by the formula:

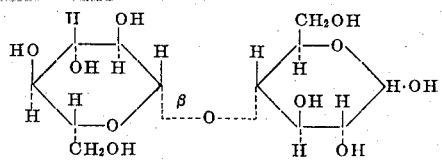

As another example of β-glycoside there may be mentioned lactose. An interesting feature of β-glycosides is that many of the β-glycosides are not readily digested by the human organism except lactose which is readily ingested by infants.

Another aspect of glycoside chemistry is that in the synthesis thereof it is complex to arrive directly at the α or β form. In most cases the chemical synthesis will yield a mixture of α and β forms and to date the methods for separating the α-form from the β-form have been noted to be most complex.

In accordance with the present invention, it has now been found that the acetal of glycopyranosides can be readily converted to the aldonic acid ester (III) by ozonolysis provided that the OR grouping of the acetal function at the anomeric center is in the equatorial orientation as described in I.

If the glycopyranoside exists in a rigid conformation in which the OR grouping of the acetal function of the anomeric center is in the axial orientation as described in II, no reaction will be observed with ozone.

Consequently, if a glycopyranoside is a conformationally non-rigid system, it exists as a mixture of conformers I and II in equilibrium. It will react with ozone via conformer I (having the OR grouping of the acetal function of the anomeric center in the equatorial orientation).

Since in most cases, β-glycopyranosides exist in a rigid conformation such as I (equatorial OR group), they are readily converted to the aldonic acid ester (III) by treatment with ozone.

Since in most cases, α-glycopyranosides exist in a rigid conformation such as II (axial OR group), they have been found to be inert to a treatment with ozone.

This reaction is illustrated schematically as follows:

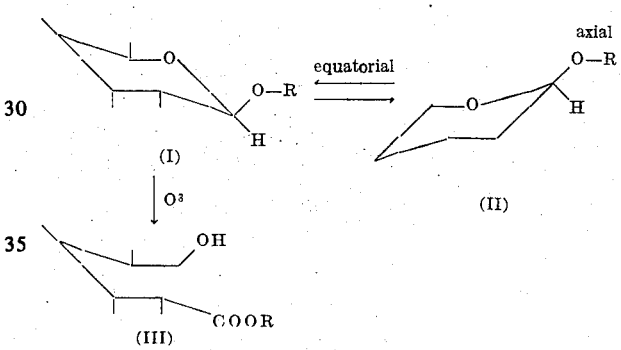

The aldonic acid esters are particularly useful in the dairy and beer industries to prevent the deposits of solids known as milkstones or beerstones in the equipment used therein and in certain textile printing processes as latent acid catalysts.

The reaction of the β-glycosides with ozone is carried out at room temperature or a lower temperature for a period of time sufficient to obtain the ester, for example, from 1 to 16 hours.

In the above reaction, the hydroxy aldonic ester III may be, when higher yields are desired, converted to the corresponding ester, for example, the acetate by carrying out the reaction in the presence of a suitable esterifying agent such as sodium acetate and acetic anhydride.

When a mixture of α and β glycosides is treated with ozone there is obtained a mixture of unreacted α-glycoside and the hydroxy aldonic acid ester from the β-glycoside and these can be readily separated, for example, by chromatography. Thus, the present invention provides a very simple method of separation and purification at the α-glycopyranoside.

The β-glycosides which can be converted to the aldonic acid esters in accordance with the present invention correspond to the general formula:

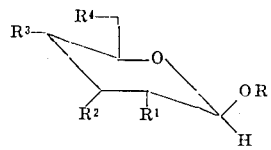

wherein
R is alkyl, aryl or a sugar moiety;
R¹, R², R³ and R⁴ stand for hydrogen, acyloxy, benzyl, alkoxy, aryloxy.

As a specific example of compounds which can be converted to corresponding aldonic acid esters there may be mentioned methyl 3,4,6-tri-O-acetyl-2-deoxy-β-D-glucopyranoside, methyl 2,3,4,6-tetra-O-acetyl-α-D-glucopyranoside.

The present invention will be more readily understood by referring to the following Examples which are given to illustrate the invention rather than limit its scope.

EXAMPLE 1

Methyl 2,3,4,6-tetra-O-acetyl-β-D-glucopyranoside (602 mg, 1.66 mmoles) dissolved in acetic anhydride (100 ml) containing sodium acetate (4 g) was ozonized for 16 hours at room temperature. The excess ozone was swept away with a stream of nitrogen and the acetic anhydride was evaporated to dryness. The residue was dissolved in water and the mixture was extracted with ether. The ether solution was washed with 5% aqueous sodium carbonate, brine, dried over magnesium sulfate, filtered and evaporated to dryness. The crude product (772 mg) was chromatographed on silica gel column. Elution with chloroform-ether (4:1) gave pure methyl 2,3,4,5,6-penta-O-acetyl-D-gluconate (667 mg., 95.1 percent yield, m.p. 120–121° C, [α]578 (CHCl₃) 9.4°).

EXAMPLE 2

This example illustrates the non oxidation of an α-glycoside.

Methyl 2,3,4,6-tetra-O-acetyl-α-D-glucopyranoside (124 mg, 0.34 mmole) dissolved in acetic anhydride (100 ml) containing sodium acetate (4 g) was ozonized for 15 hours at room temperature. The excess ozone was swept away with a stream of nitrogen and the acetic anhydride was evaporated to dryness. The residue was dissolved in water and the mixture was extracted with ether. The ether solution was washed with 5% aqueous sodium carbonate, brine, dried over magnesium sulfate, filtered and evaporated to dryness. The crude product was chromotographed on a column of silica gel. Elution with chloroform-ether gave a compound (110 mg, 88 percent yield) which was found completely identical with the starting material: methyl 2,3,4,6-tetra-O-acetyl-α-D-glucopyranoside.

EXAMPLE 3

OZONOLYSIS OF METHYL 3,4,6-TRI-O-ACETYL-2-DEOXY-β-D-GLUCO-PYRANOSIDE

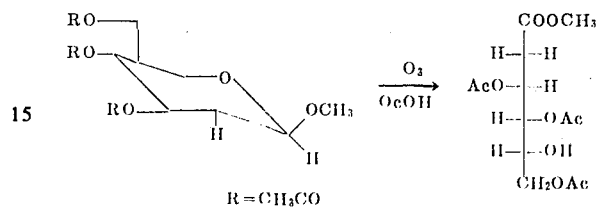

Methyl 3,4,6-tri-O-acetyl-2-deoxy-β-D-glucopyranoside (580 mg., 1.9 mmoles) dissolved in glacial acetic acid was ozonized at room temperature during 1.5 hours. The excess ozone was swept away with a stream of nitrogen and the acetic was evaporated to dryness. Purification by preparative thin layer chromatography gave pure methyl 3,4,6-tri-O-acetyl-2-deoxy-D-gluconate (486 mg., 80 percent yield).

EXAMPLE 4

OZONOLYSIS OF METHYL 2,3,4-TRI-O-ACETYL-α-D-XYLOPYRANOSIDE

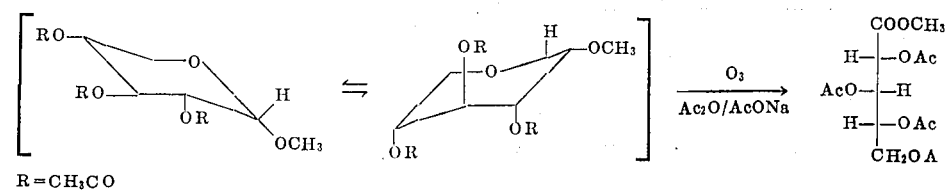

Methyl 2,3,4-tri-O-acetyl-α-D-xylopyranoside (689 mg., 2.4 mmoles) dissolved in acetic anhydride (100 ml) containing sodium acetate (4 g) was ozonized at room temperature during 17 hours. The excess ozone was swept away with a stream of nitrogen and the acetic anhydride was evaporated to dryness. The residue was dissolved in water and extracted with chloroform. The chloroform solution was washed with 5% aqueous sodium bicarbonate, brine, dried over magnesium sulfate, filtered and evaporated to dryness. The crude product was shown to contain 55 percent of starting material (methyl 2,3,4-tri-O-acetyl-α-D-xylopyranoside and 45% of methyl 2,3,4,5-tetra-O-acetyl-D-xylonate. These products were isolated by preparative thin layer chromatography (Silica Gel) yielding 385 mg of starting material and 339 mg of methyl 2,3,4,5-tetra-O-acetyl-D-xylonate (93 percent yield, based on reacted starting material). After 71 hours of ozonolysis, the crude product was a mixture of 92% of methyl 2,3,4,5-tetra-O-acetyl-D-xylonate and 8% of methyl 2,3,4-tri-O-acetyl-α-D-xylopyranoside.

EXAMPLE 5

OZONOLYSIS OF METHYL 2,3,4-TRI-O-ACETYL-β-D-XYLOPYRANOSIDE

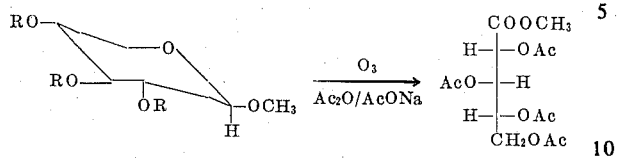

Methyl 2,3,4-tri-O-acetyl-β-D-xylopyranoside (645 mg, 2.2 mmoles) dissolved in acetic anhydride (100 ml) containing sodium acetate (4 g) was ozonized at room temperature during 8 hours. The excess ozone was swept away with a stream of nitrogen and the acetic anhydride was evaporated to dryness. The residue was dissolved in water and extracted with chloroform. The chloroform solution was washed with 5% aqueous sodium carbonate, brine, dried over magnesium sulfate, filtered and evaporated to dryness. The crude product was purified by preparative thin layer chromatography (Silica Gel) yielding pure methyl 2,3,4,5-tetra-O-acetyl-D-xylonate (602 mg, 78 percent yield).

EXAMPLE 6

PURIFICATION OF METHYL 3,4,6-TRI-O-ACETYL-2-DEOXY-α-D-GLUCO-PYRANOSIDE FROM THE α-β MIXTURE

A mixture (1 g) containing methyl 3,4,6-tri-O-acetyl-2-Deoxy-β-D-glucopyranoside (20%) and methyl 3,4,6-tri-O-acetyl-2-deoxy-α-D-glucopyranoside (80%) was dissolved in glacial acetic acid (100 ml) and ozonized during 2 hours at room temperature. The solvent was removed in vacuo and the crude product was chromatographed on a column of silica gel. Elution with benzene ether (9:1) gave the starting pure methyl 3,4,6-tri-O-acetyl-2-deoxy-α-D-glucopyranoside.

What is claimed is:

1. A process which comprises treating with ozone a glycopyranoside acetal, wherein the OR grouping is in the equatorial orientation with respect to the anomeric center, thereby to form the corresponding aldonic acid ester, and wherein R is alkyl, aryl, aralkyl or a sugar moiety.

2. A process which comprises treating a β-glycoside of the formula:

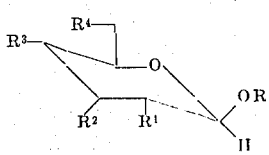

wherein R is alkyl, aryl, aralkyl or a sugar moiety;
$R^1$, $R^2$, $R^3$ and $R^4$ stand for hydrogen, acyloxy, alkoxy, aryloxy or aralkoxy
with ozone to form a 5-hydroxy aldonic acid ester of the formula:

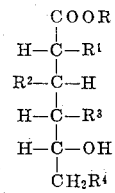

3. A process which comprises treating a mixture of α and β-glycosides of the formula:

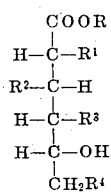

wherein R is alkyl, aryl, aralkyl or a sugar moiety;
$R^1$, $R^2$, $R^3$ and $R^4$ stand for hydrogen, acyloxy, alkoxy, aryloxy or aralkoxy
with ozone and separating from the reaction mixture the 5-hydroxy aldonic acid ester of the formula:

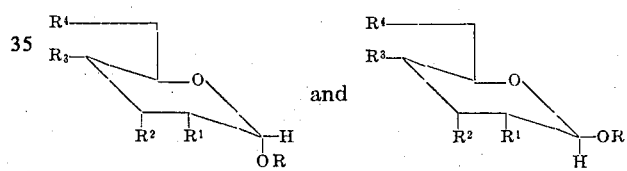

and recovering the starting α-glycoside.

4. The process of claim 2, wherein the starting β-glycoside is methyl 2,3,4,6-tetra-O-acetyl-β-D-gluco-pyranoside and the gluconate obtained is the methyl 2,3,4,5,6-penta-O-acetyl-D-gluconate and wherein the reacting is carried out in the presence of acetic anhydride and sodium acetate.

5. The process of claim 2, wherein the starting β-glycoside is methyl 3,4,6-tri-O-acetyl-2-deoxy-β-D-gluco-pyranoside and the gluconate obtained is the methyl 3,4,6-tri-O-acetyl-2-deoxy-D-gluconate.

6. Methyl 3,4,5,6-tetra-O-acetyl-2-deoxy-D-gluconate.

* * * * *